US010720719B2

(12) United States Patent
Downing et al.

(10) Patent No.: US 10,720,719 B2
(45) Date of Patent: Jul. 21, 2020

(54) JACKSCREW ASSEMBLIES FOR CIRCUIT BOARD CONNECTIONS

(71) Applicants: Richard L. Downing, Loves Park, IL (US); Eric A. Carter, Monroe, WI (US)

(72) Inventors: Richard L. Downing, Loves Park, IL (US); Eric A. Carter, Monroe, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 722 days.

(21) Appl. No.: 15/334,052

(22) Filed: Oct. 25, 2016

(65) Prior Publication Data

US 2018/0115097 A1 Apr. 26, 2018

(51) Int. Cl.

*F16B 35/00* (2006.01)
*H01R 12/70* (2011.01)
*H01R 13/621* (2006.01)
*H01R 12/73* (2011.01)

(52) U.S. Cl.

CPC ..... *H01R 12/7047* (2013.01); *H01R 13/6215* (2013.01); *H01R 12/73* (2013.01)

(58) Field of Classification Search

CPC . H01R 12/7047; H01R 13/6215; H01R 12/73
USPC .................. 411/389; 361/786, 804, 790, 785
See application file for complete search history.

(56) References Cited

U.S. PATENT DOCUMENTS 4,169,308 A * 10/1979 Minogue .................. G09F 7/16 248/466
4,372,718 A * 2/1983 Zaydel .................... F16B 9/026 411/105
4,928,531 A * 5/1990 Schult ..................... F16B 35/00 411/107
4,929,184 A * 5/1990 Emadi ................ H01R 13/6453 439/362
4,934,950 A 6/1990 Green et al.
5,066,246 A * 11/1991 Jensik ................ H01R 13/6215 29/842
5,575,686 A * 11/1996 Noschese ............... H01R 23/68 327/262
6,273,742 B1 8/2001 Castagna et al.
6,280,202 B1 * 8/2001 Alden, 3rd ............. H05K 7/142 174/138 D
8,152,428 B2 * 4/2012 Rowe ...................... F16B 5/025 269/48
8,757,575 B2 * 6/2014 Lin ........................ H05K 7/142 248/346.03
9,042,105 B2 * 5/2015 Malek .................. H05K 7/1417 361/748
9,160,151 B2 10/2015 Vinther et al.
(Continued)

*Primary Examiner* — Gary W Estremsky

(74) *Attorney, Agent, or Firm* — Locke Lord LLP; Daniel J. Fiorello; Scott D. Wofsy

(57) ABSTRACT

A jackscrew assembly for a circuit board connector includes a jackset drive cap including drive cap threads and a jackset body. The jackset body includes first jackset body threads configured to mate with the drive cap threads and second jackset body threads configured to mate with a separate fixed connector fastener. The jackset drive cap and the jackset body are configured to retain a connector body therebetween in an assembled state while allowing the jackscrew assembly to rotate relative to the connector body.

16 Claims, 3 Drawing Sheets

(56) References Cited

U.S. PATENT DOCUMENTS

| | | | | |
|---|---|---|---|---|
| 9,374,900 | B2 * | 6/2016 | Huffman | H05K 1/144 |
| 2007/0159777 | A1 * | 7/2007 | Shin | G06F 1/1601<br>361/679.22 |
| 2007/0275604 | A1 * | 11/2007 | van Meijl | H01R 13/6215<br>439/607.41 |
| 2015/0146400 | A1 * | 5/2015 | Huffman | H05K 1/144<br>361/790 |

* cited by examiner

JACKSCREW ASSEMBLIES FOR CIRCUIT BOARD CONNECTIONS

BACKGROUND

1. Field

The present disclosure relates to connectors for circuit boards, more specifically to jackscrew assemblies for circuit board connections.

2. Description of Related Art

Jackset hardware that is used to secure circuit board connectors (e.g., 55302 style), for example, have several shortcomings. The jackset hardware is a small thread (e.g., #2-56) that is easily damaged by handling or installation. The jackset hardware is traditionally made from 300 series stainless steel and, once damaged, it seizes together when the connectors are mated. Current jackset hardware results in broken jackset hardware that requires replacement of the entire connector body from the circuit board.

The jackset hardware also requires additional labor to mask during conformal coating. The jackset is located fairly close to the pins/circuit board solder pads requiring careful control of masking materials and care when removing the masking to avoid exposing the neighboring electrical contact/solder joints. The masking becomes more difficult when parylene coating is used as both sides of the rotating jackset hardware need to be masked and complete removal of the masking material is required to ensure proper mating of the jackset hardware.

Such conventional methods and systems have generally been considered satisfactory for their intended purpose. However, there is still a need in the art for improved jackscrew assemblies. The present disclosure provides a solution for this need.

SUMMARY

A jackscrew assembly for a circuit board connector includes a jackset drive cap including drive cap threads and a jackset body. The jackset body includes first jackset body threads configured to mate with the drive cap threads and second jackset body threads configured to mate with a separate fixed connector fastener. The jackset drive cap and the jackset body are configured to retain a connector body therebetween in an assembled state while allowing the jackscrew assembly to rotate relative to the connector body.

The drive cap threads can be female threads such that the drive cap threads are disposed in a drive cap channel. The first jackset body threads can be male threads such that the first jackset body threads are disposed on a cap connector portion sized to thread into the drive cap channel. The reverse is also contemplated herein.

The cap connector portion can include a smaller outer diameter than an external connector portion of the jackset body, for example. Any other suitable relative dimensions of the cap connector portion are contemplated herein. In certain embodiments, the jackset drive cap includes an outer diameter that is the same as the external connector portion of the jackset body. Any other suitable dimensions are contemplated herein.

In certain embodiments, the second jackset body threads can be female threads such that the second jacket body threads are disposed in a jackset body channel configured to receive the separate connector fastener.

The cap connector portion can be longer than the drive cap channel such that a gap is defined between the external connector portion and the drive cap for receiving and retaining an extension of a connector body. The cap connector portion can include an unthreaded end portion.

The drive cap can include a head for driving the drive cap. The head of the drive cap includes a hex head, for example, or any other suitable head type.

In certain embodiments, the assembly can include the connector body wherein the drive cap and the jackset body are mated together around a connector body in the assembled state. The connector body can be connected to a printed circuit board. The drive cap and the jackset body can be mated together such that a force required to decouple the drive cap and the jackset body is greater than a force used to couple and/or decouple the second jackset threads from the separate fixed connector fastener such that removing the assembly from the separate connector fastener does not cause the jackset drive cap and the jackset body to decouple unless the jackset body is immovable relative to the fixed jackscrew.

A circuit board assembly can include a first circuit board having a first connector body and a first fixed jackscrew connected to the first connector body and a second circuit board having a second connector body and a jackscrew assembly as described above rotatably mounted to the second connector body. The drive cap and the jackset body are mated together such that a force required to decouple the drive cap and the jackset body is greater than a force used to couple and/or decouple the second jackset threads from the fixed jackscrew such that removing the assembly from the first connector body does not cause the jackset drive cap and the jackset body to decouple unless the jackset body is immovable relative to the fixed jackscrew.

A method includes assembling a first circuit board in accordance with any embodiment described herein to any suitable second circuit board.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
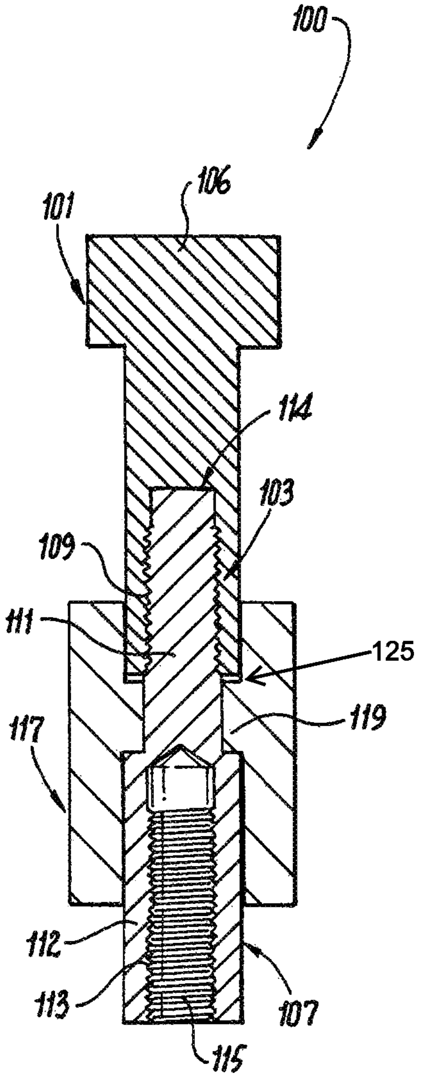
FIG. 1 is a cross-sectional view of an embodiment of a jackscrew assembly in accordance with this disclosure, shown retaining a connector body.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 2-6. The systems and methods described herein can be used to allow simplified installation and removal of circuit boards (e.g., PWB/PCB's) without the need to remove a connector body mounted to the circuit board.

Figure 2:
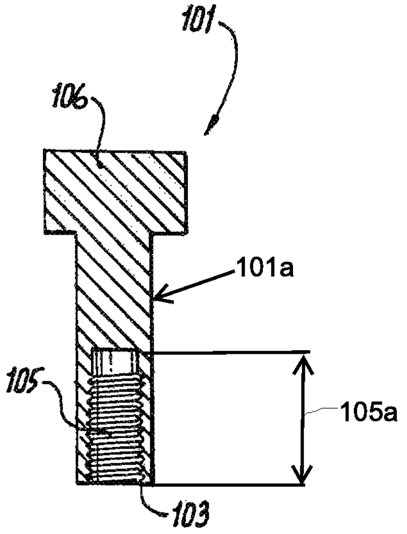
FIG. 2 is a cross-sectional view of an embodiment of a jackset drive cap in accordance with this disclosure.

Referring to FIG. 1, a jackscrew assembly 100 for a circuit board connector includes a jackset drive cap 101 including drive cap threads 103. Referring additionally to FIG. 2, in certain embodiments, the drive cap threads 103 can be female threads such that the drive cap threads 103 are disposed in a drive cap channel 105. It is contemplated that the drive cap threads 103 can be male threads.

The drive cap 101 can include a head 106 for driving the drive cap 101. The head 106 of the drive cap 101 can include a hex head, for example, or any other suitable head type.

Figure 3:
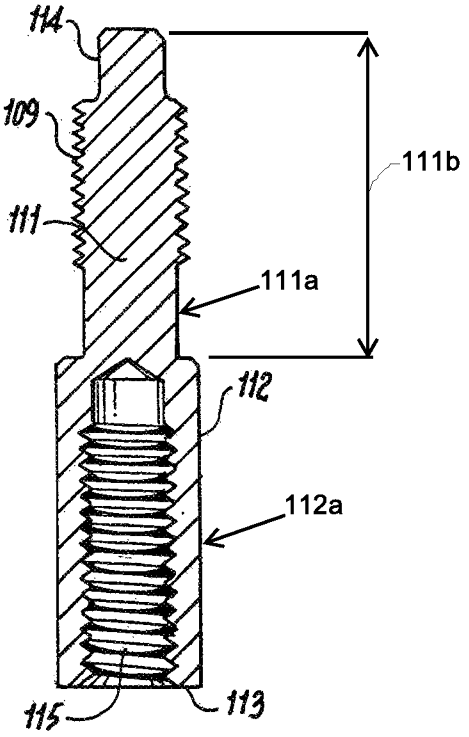
FIG. 3 is a cross-sectional view of an embodiment of a jackset body in accordance with this disclosure.

Referring additionally to FIG. 3, the assembly 100 includes a jackset body 107. The jackset body 107 includes first jackset body threads 109 configured to mate with the drive cap threads 103, e.g., as shown in FIG. 1. In embodiments where drive cap threads 103 are female threads, as shown, the first jackset body threads 109 can be male threads. For example, the first jackset body threads 109 can be disposed on a cap connector portion 111 sized to thread into the drive cap channel 105. In any case, the thread type of the first jackset body threads 109 can be the reverse of the type of the drive cap threads 103 so that they can mate.

As shown in FIG. 1, the cap connector portion 111 can include a smaller outer diameter 111*a* than an external connector portion 112 of the jackset body 107, for example. Any other suitable relative dimensions of the cap connector portion 111 are contemplated herein. In certain embodiments, the jackset drive cap 101 includes an outer diameter 101*a* that is the same as an outer diameter 112*a* of the external connector portion 112 of the jackset body 107. Any other suitable dimensions are contemplated herein (e.g., smaller, larger). In certain embodiments, the cap connector portion 111 can include an unthreaded end portion 114, however, it is contemplated that any suitable portions and/or the entirety of the cap connector portion 111 can be threaded.

The jackset body 107 also includes second jackset body threads 113 configured to mate with a separate fixed connector fastener (e.g., a fixed jackscrew associated with a connector of a separate circuit board). The second jackset body threads 113 can be disposed on the external connector portion 112. In certain embodiments, the second jackset body threads 113 can be female threads such that the second jacket body threads 113 are disposed in a jackset body channel 115 configured to receive the separate connector fastener. It is contemplated that the second jackset body threads 113 can male threads configured to mate with the separate fixed connector fastener.

Figure 4:
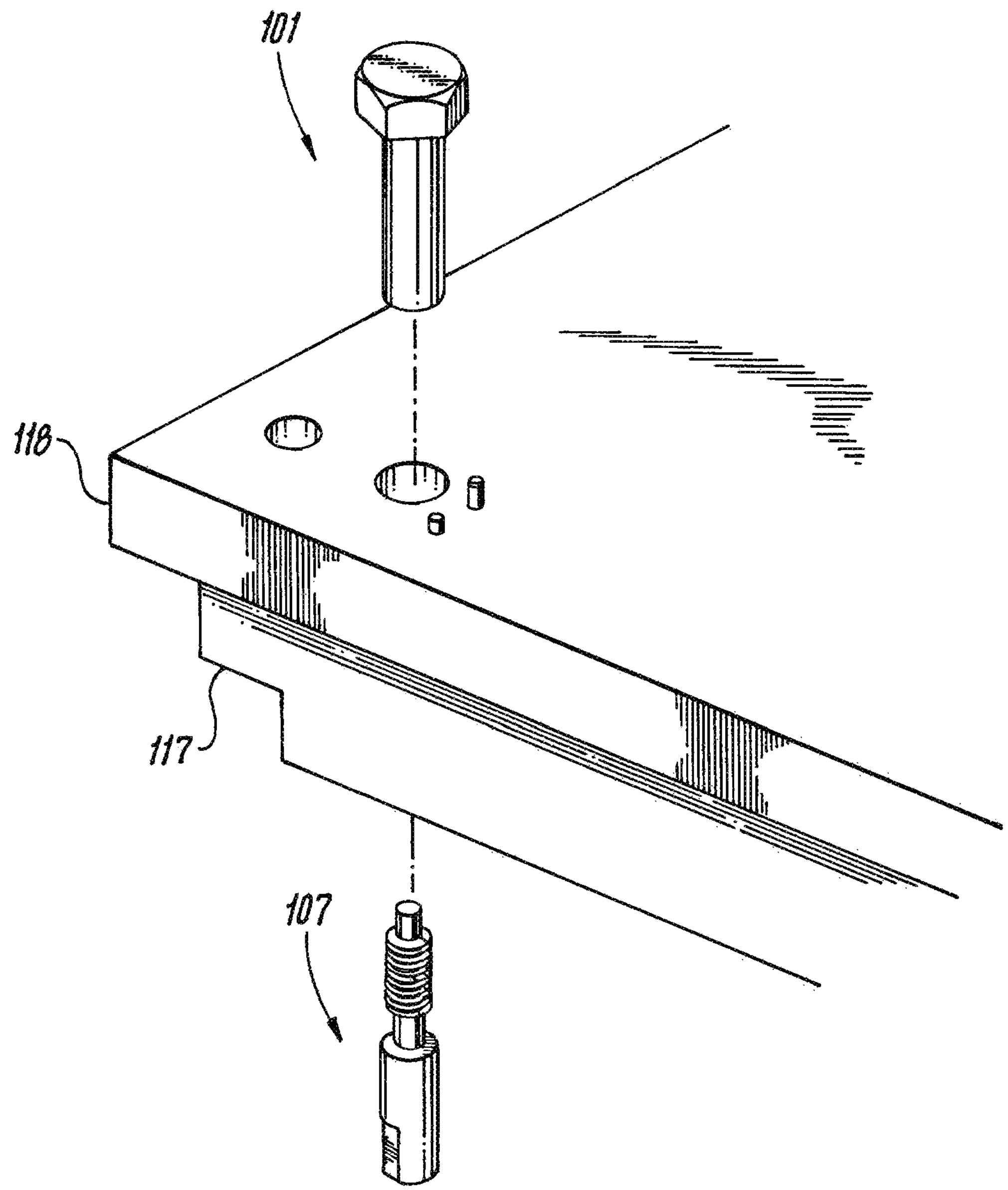
FIG. 4 is a perspective view of an embodiment of a jackscrew assembly in accordance with this disclosure, shown having the jackset drive cap and the jackset body separated before insertion into the connector body that is attached to a circuit board.

As shown in FIG. 1, the jackset drive cap 101 and the jackset body 107 are configured to retain a connector body 117 therebetween in an assembled state while allowing the jackscrew assembly 100 to rotate relative to the connector body 117. Referring additionally to FIG. 4, the connector body 117 can be connected to a circuit board 118 (e.g., a PCB/PWA) in any suitable manner before installing the drive cap 101 and the jackset body 107, for example.

The cap connector portion 111 can be longer than the drive cap channel 105 (e.g., portion 111 can have an axial dimension 111*b* that is greater an axial depth 105*a* of the of the drive cap channel 105) such that an axial gap 125 is maintained between the external connector portion 112 and the drive cap 101 when the two are fully assembled to one another. In this regard, the assembly 100 can be configured for receiving and retaining an extension 119 of the connector body 117 within the axial gap 125. For example, as shown, there can be play between the assembly 100 and the connector body 117 (e.g., where the gap is larger than the extension 119) so that the assembly 100 can be rotated and can be screwed on to another separate fastener.

In certain embodiments, the drive cap 101 and the jackset body 107 can be mated together such that a force required to decouple the drive cap 101 and the jackset body 107 is greater than a force used to couple and/or decouple the second jackset threads 113 from the separate fixed connector fastener (e.g., a fixed screw) such that removing the assembly 100 from the separate connector fastener does not cause the jackset drive cap 101 and the jackset body 107 to decouple unless the jackset body 107 is immovable relative to the fixed connector fastener (e.g., where the thread breaking has locked the jackset body 107 to the separate connector fastener). In this regard, the drive cap 101 and the jackset body 107 can be high strength locked together in any suitable manner (e.g., high stress thread locking, suitable adhesive) to a predetermined breaking force.

Figure 5:
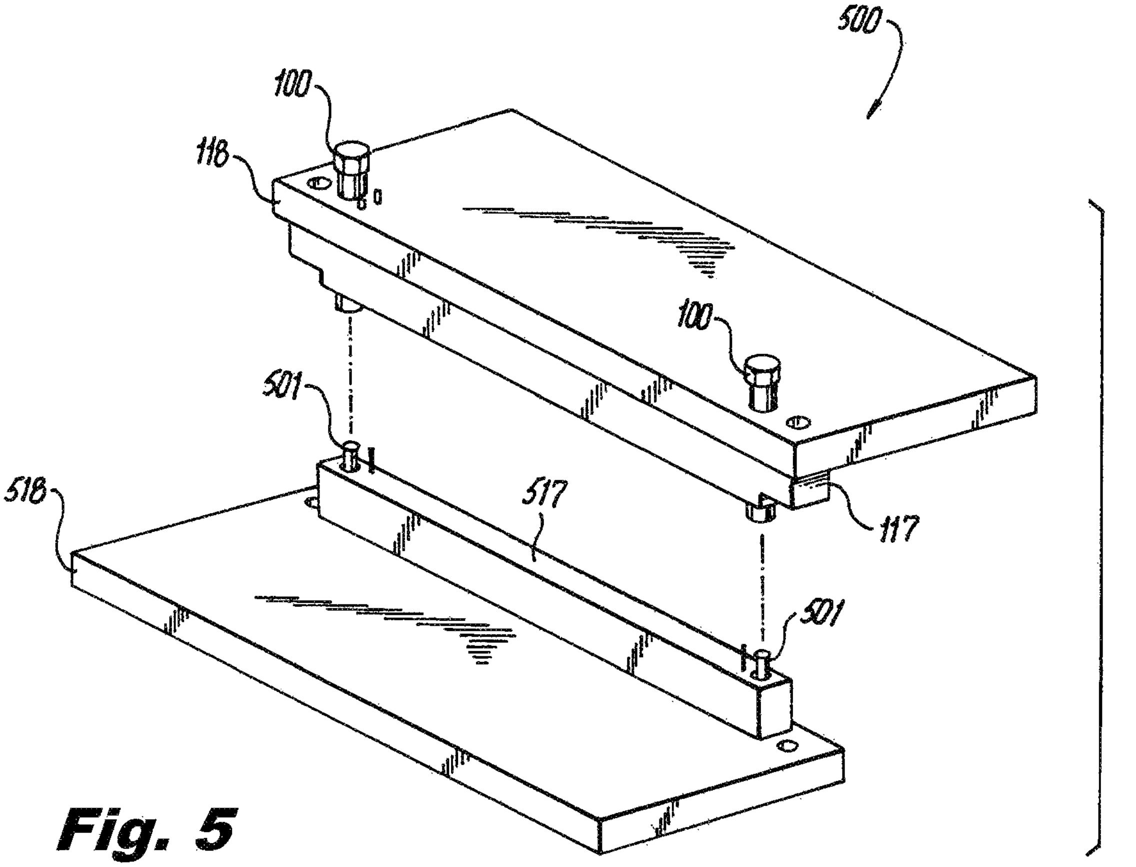
FIG. 5 is a perspective view of an embodiment of circuit board assembly in accordance with this disclosure, shown having two circuit boards unattached.
Figure 6:
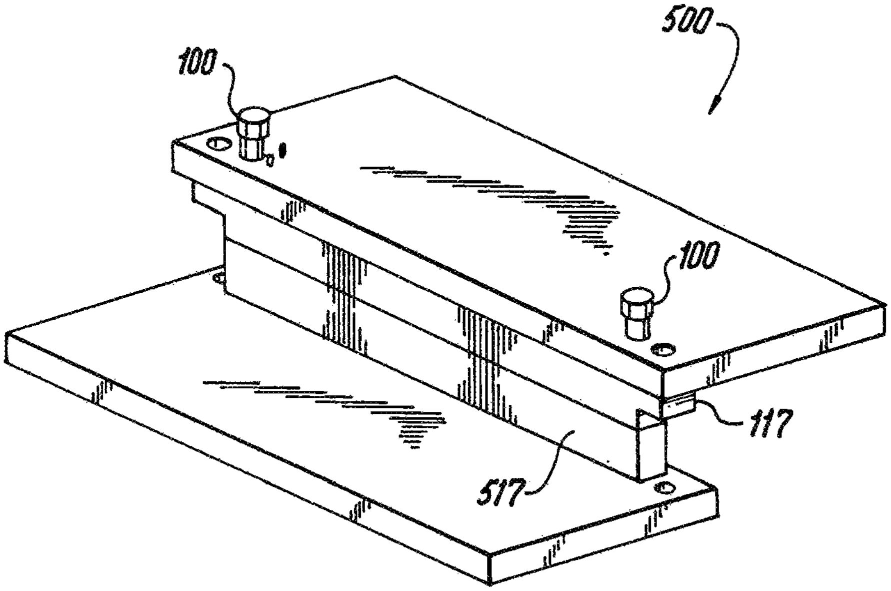
FIG. 6 is a perspective view of the circuit board assembly of FIG. 5, shown having the two circuit boards attached via a jackscrew assembly.

Referring to FIG. 5, a circuit board assembly 500 can include a first circuit board 518 having a first connector body 517 and a first fixed jackscrew 501 (or any other suitable jackscrew, e.g., as described hereinabove) connected to the first connector body 517. A second circuit board 118 can include a second connector body 117 and a jackscrew assembly 100 as described above rotatably mounted to the second connector body 117. FIG. 6 shows the first circuit board 518 and the second circuit board 118 connected.

Embodiments above include a two piece rotating jackset for use with circuit board connectors (e.g., MIL-DTL-55302 style connector). As described above, interference between the drive cap threads and the first jackset body threads and/or any suitable thread locking compound prevents the jackset body and drive cap from separating under normal usage. If damaged such that the jackset body cannot separate from a fixed screw (e.g., fixed jackscrew 501), the jackset body and drive cap will separate (breaking the thread lock bond) allowing the connector to be unmated and the jackscrew assembly to be replaced without removing the connector from the circuit board.

Embodiments can be installed after the PWA is coated. Also, the assembly does not require the use of a cross pin. To simplify masking for conformal coating, a version of the fixed jackset can be used with longer retaining threads. The fixed jackset can also be installed into the connector after assembly and coating. The longer threads can allow the fixed jackset to pass through the PWA and a nut can be installed to retain the fixed jackset. Any threads and/or other mating surfaces described above can be coated with pre-applied thread locking compound to simplify the factory installation process.

To assemble the rotating jackset hardware, the cap connector portion 111 can be installed into the drive cap channel

105. These components can be threaded together until the end of the cap connector portion 111 bottoms at the end of the drive cap channel 105. The components can be sized to provide clearance between the assembled rotating jackset and the connector body when fully seated. The interference caused by bottoming of the threads can lock the components of the rotating jackset together when the jackset is being driven to mate the connectors. The high strength thread lock bonds the rotating jackset components together if the jackset is driven in reverse to un-mate the connectors.

In the event a jackset seizes, the threadlock bond will break due to the higher than normal torque due to the sized jackset. The drive cap 101 will then unthread from the jackset body 107 and the connector can be unmated by hand. Embodiments as described above can be utilized in traditional connectors without any modification/update to the connector body. Embodiments can be easily installed and removed/replaced without connector replacement. Moreover, installing after conformal coating simplifies masking of the connector. The connector jackset locations do not need to be masked during the application of parylene coating, reducing masking and de-masking labor and eliminating two potential locations for coating rework.

The methods and systems of the present disclosure, as described above and shown in the drawings, provide for jackscrew assemblies for circuit boards with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A jackscrew assembly for a circuit board connector, comprising:

a jackset drive cap, wherein the jackset drive cap includes drive cap threads, wherein the drive cap threads are female threads such that the drive cap threads are disposed in a drive cap channel; and a jackset body threadably engagable with the jackset drive cap, the jackset drive cap and the jackset body being sized and configured to retain a connector body therebetween while in an assembled state while allowing the jackscrew assembly to rotate relative to the connector body, wherein the jackset body includes:

a cap connector portion;

first jackset body threads configured to mate with the drive cap threads, wherein the first jackset body threads are male threads such that the first jackset body threads are disposed on the cap connector portion, wherein the cap connector portion is sized to thread into the drive cap channel, wherein the cap connector portion includes a smaller outer diameter than an external connector portion of the jackset body, wherein the jackset drive cap includes an outer diameter that is the same as the external connector portion of the jackset body; and second jackset body threads configured to mate with a separate fixed connector fastener, wherein the second jackset body threads are female threads such that the second jacket body threads are disposed in a jackset body channel configured to receive the separate connector fastener, wherein the drive cap includes a head for driving the drive cap, wherein the head of the drive cap includes a hex head.

2. The assembly of claim 1, wherein the cap connector portion is longer than the drive cap channel such that a gap is defined between the external connector portion and the drive cap for receiving and retaining an extension of the connector body.

3. The assembly of claim 1, wherein the cap connector portion includes an unthreaded end portion.

4. The assembly of claim 1, further including the connector body wherein the drive cap and the jackset body are mated together around the connector body in the assembled state.

5. The assembly of claim 4, wherein the drive cap and the jackset body are mated together such that a force required to decouple the drive cap and the jackset body is greater than a force used to couple and/or decouple the second jackset threads from the separate fixed connector fastener such that removing the assembly from the separate connector fastener does not cause the jackset drive cap and the jackset body to decouple unless the jackset body is immovable relative to the separate fixed connector fastener.

6. The assembly of claim 5, wherein the connector body is connected to a printed circuit board.

7. A circuit board assembly, comprising:

a first circuit board having a first connector body and a first fixed jackscrew connected to the first connector body; and a second circuit board comprising a second connector body and a jackscrew assembly rotatably mounted to the second connector body, the jackscrew assembly comprising:

a jackset drive cap including drive cap threads;

a jackset body, comprising:

a cap connector portion;

first jackset body threads configured to mate with the drive cap threads; and second jackset body threads configured to mate with the first fixed jackscrew;

wherein, the jackset drive cap and the jackset body are configured to retain a connector body therebetween in an assembled state while allowing the jackscrew assembly to rotate relative to the connector body, wherein the drive cap threads are female threads such that the drive cap threads are disposed in a drive cap channel, and the first jackset body threads are male threads such that the first jackset body threads are disposed on the cap connector portion, wherein the cap connector portion is sized to thread into the drive cap channel, wherein the cap connector portion includes a smaller outer diameter than an external connector portion of the jackset body, wherein the drive cap and the jackset body are mated together such that a force required to decouple the drive cap and the jackset body is greater than a force used to couple and/or decouple the second jackset threads from the fixed jackscrew such that removing the assembly from the first connector body does not cause the jackset drive cap and the jackset body to decouple unless the jackset body is immovable relative to the fixed jackscrew.

8. The assembly of claim 7, wherein the second jackset body threads are female threads such that the second jacket body threads are disposed in a jackset body channel configured to receive a separate connector fastener.

9. The assembly of claim 7, wherein the cap connector portion is longer than the drive cap channel such that a gap is defined between the external connector portion and the drive cap for receiving and retaining an extension of the connector body.

10. A jackscrew assembly for a circuit board connector, comprising:

a jackset drive cap, wherein the jackset drive cap includes drive cap threads, wherein the drive cap threads are female threads such that the drive cap threads are disposed in a drive cap channel; and a jackset body threadably engagable with the jackset drive cap, the jackset drive cap and the jackset body being sized and configured to retain a connector body therebetween while in an assembled state while allowing the jackscrew assembly to rotate relative to the connector body, wherein the jackset body includes:

a cap connector portion;

first jackset body threads configured to mate with the drive cap threads, wherein the first jackset body threads are male threads such that the first jackset body threads are disposed on the cap connector portion, wherein the cap connector portion is sized to thread into the drive cap channel, wherein the cap connector portion includes a smaller outer diameter than an external connector portion of the jackset body, wherein the cap connector portion is longer than the drive cap channel such that a gap is defined between the external connector portion and the drive cap for receiving and retaining an extension of the connector body; and second jackset body threads configured to mate with a separate fixed connector fastener wherein the drive cap and the jackset body are mated together such that a force required to decouple the drive cap and the jackset body is greater than a force used to couple and/or decouple the second jackset threads from the separate fixed connector fastener such that removing the assembly from the separate connector fastener does not cause the jackset drive cap and the jackset body to decouple unless the jackset body is immovable relative to the separate fixed connector fastener.

11. The assembly of claim 10, further including the connector body wherein the drive cap and the jackset body are mated together around the connector body in the assembled state.

12. The assembly of claim 11, wherein the connector body is connected to a printed circuit board.

13. A jackscrew assembly for a circuit board connector, comprising:

a jackset drive cap, wherein the jackset drive cap includes drive cap threads;

a jackset body threadably engagable with the jackset drive cap, the jackset drive cap and the jackset body being sized and configured to retain a connector body therebetween while in an assembled state while allowing the jackscrew assembly to rotate relative to the connector body, wherein the jackset body includes:

first jackset body threads configured to mate with the drive cap threads; and second jackset body threads configured to mate with a separate fixed connector fastener; and the connector body wherein the drive cap and the jackset body are mated together around the connector body in the assembled state, wherein the drive cap and the jackset body are mated together such that a force required to decouple the drive cap and the jackset body is greater than a force used to couple and/or decouple the second jackset threads from the separate fixed connector fastener such that removing the assembly from the separate connector fastener does not cause the jackset drive cap and the jackset body to decouple unless the jackset body is immovable relative to the separate fixed connector fastener.

14. A circuit board assembly, comprising:

a first circuit board having a first connector body and a first fixed jackscrew connected to the first connector body; and a second circuit board comprising a second connector body and a jackscrew assembly rotatably mounted to the second connector body, the jackscrew assembly comprising:

a jackset drive cap including drive cap threads;

a jackset body, comprising:

first jackset body threads configured to mate with the drive cap threads; and second jackset body threads configured to mate with the first fixed jackscrew;

wherein, the jackset drive cap and the jackset body are configured to retain a connector body therebetween in an assembled state while allowing the jackscrew assembly to rotate relative to the connector body, wherein the drive cap and the jackset body are mated together such that a force required to decouple the drive cap and the jackset body is greater than a force used to couple and/or decouple the second jackset threads from the fixed jackscrew such that removing the assembly from the first connector body does not cause the jackset drive cap and the jackset body to decouple unless the jackset body is immovable relative to the fixed jackscrew.

15. A jackscrew assembly for a circuit board connector, comprising:

a jackset drive cap, wherein the jackset drive cap includes drive cap threads, wherein the drive cap threads are female threads such that the drive cap threads are disposed in a drive cap channel; and a jackset body threadably engagable with the jackset drive cap, the jackset drive cap and the jackset body being sized and configured to retain a connector body therebetween while in an assembled state while allowing the jackscrew assembly to rotate relative to the connector body, wherein the jackset body includes:

a cap connector portion;

first jackset body threads configured to mate with the drive cap threads, wherein the first jackset body threads are male threads such that the first jackset body threads are disposed on the cap connector portion, wherein the cap connector portion is sized to thread into the drive cap channel, wherein the cap connector portion includes a smaller outer diameter than an external connector portion of the jackset body, wherein the jackset drive cap includes an outer diameter that is the same as the external connector portion of the jackset body; and second jackset body threads configured to mate with a separate fixed connector fastener, wherein the cap connector portion includes an unthreaded end portion.

16. A jackscrew assembly for a circuit board connector, comprising:

a jackset drive cap, wherein the jackset drive cap includes drive cap threads, wherein the drive cap threads are female threads such that the drive cap threads are disposed in a drive cap channel; and a jackset body threadably engagable with the jackset drive cap, the jackset drive cap and the jackset body being sized and configured to retain a connector body therebetween while in an assembled state while allowing the jackscrew assembly to rotate relative to the connector body, wherein the jackset body includes:

a cap connector portion;

first jackset body threads configured to mate with the drive cap threads, wherein the first jackset body threads are male threads such that the first jackset body threads are disposed on the cap connector portion, wherein the cap connector portion is sized to thread into the drive cap channel, wherein the cap connector portion includes a smaller outer diameter than an external connector portion of the jackset body, wherein the jackset drive cap includes an outer diameter that is the same as the external connector portion of the jackset body; and second jackset body threads configured to mate with a separate fixed connector fastener, wherein the second jackset body threads are female threads such that the second jacket body threads are disposed in a jackset body channel configured to receive the separate connector fastener, wherein the drive cap and the jackset body are mated together such that a force required to decouple the drive cap and the jackset body is greater than a force used to couple and/or decouple the second jackset threads from the separate fixed connector fastener such that removing the assembly from the separate connector fastener does not cause the jackset drive cap and the jackset body to decouple unless the jackset body is immovable relative to the separate fixed connector fastener.

* * * * *